Aug. 18, 1931.  H. F. JACKSON ET AL  1,819,330
LIQUID DISPENSING APPARATUS
Filed March 3, 1928  2 Sheets-Sheet 2
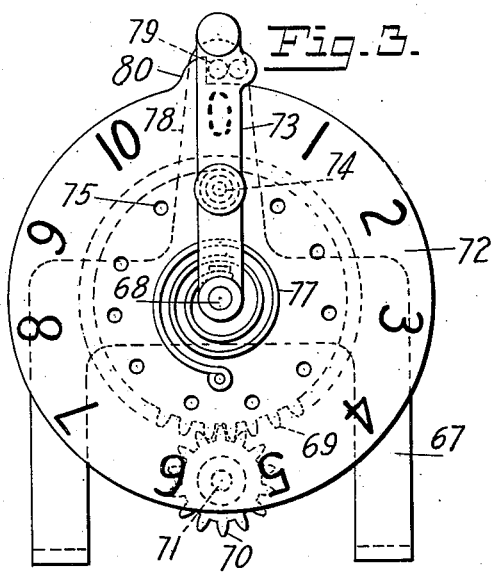
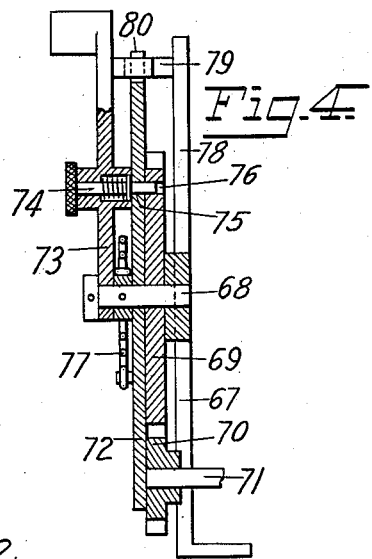
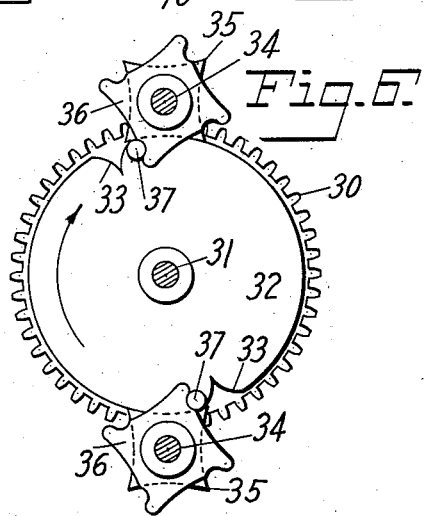
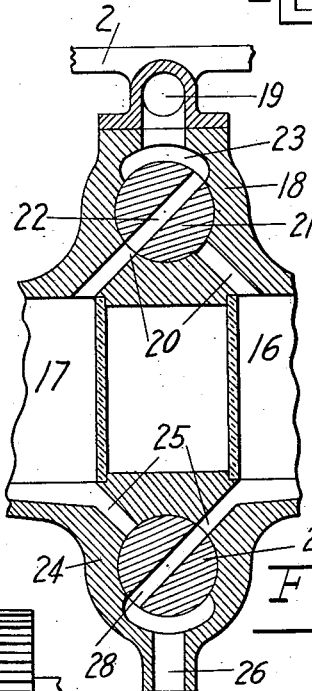
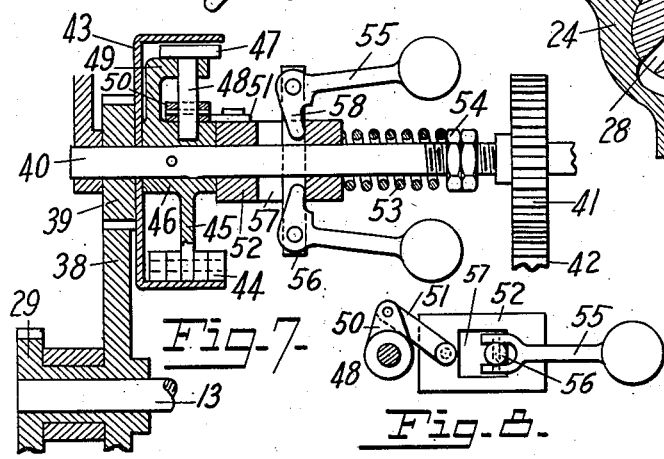
INVENTOR.
CHARLES O. STRAUB.
HARRY F. JACKSON.
ATTORNEY.

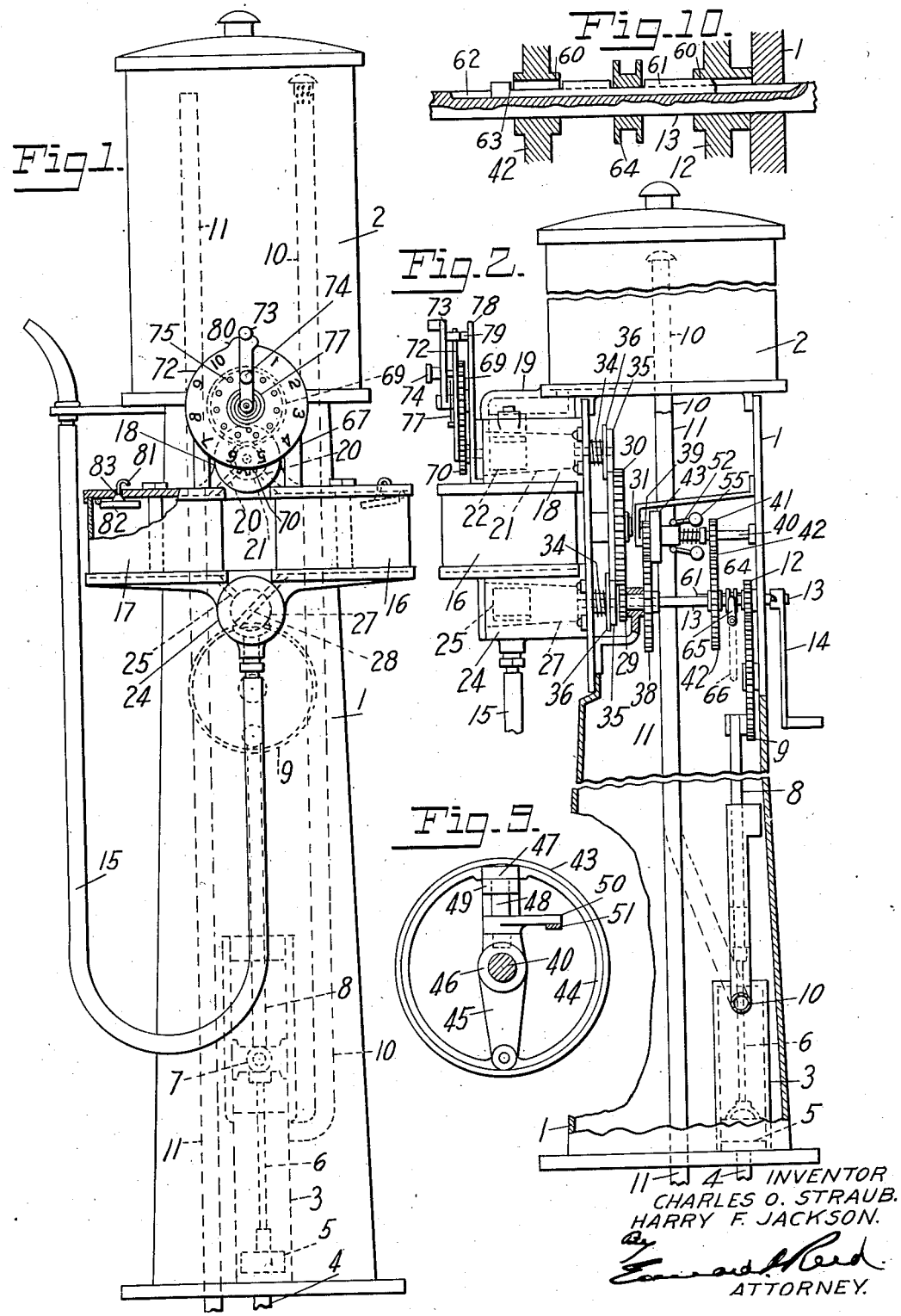

Patented Aug. 18, 1931

1,819,330

UNITED STATES PATENT OFFICE

HARRY F. JACKSON AND CHARLES O. STRAUB, OF SPRINGFIELD, OHIO

LIQUID DISPENSING APPARATUS

Application filed March 3, 1928. Serial No. 258,977.

This invention relates to liquid dispensing apparatus and more particularly to gasoline pumps such as are commonly employed at automobile filling stations.

One object of the invention is to provide a dispensing apparatus of this kind which will deliver accurately measured quantities of liquid and which will be of such a character that the customer can readily ascertain whether or not he is receiving full measure.

A further object of the invention is to provide such an apparatus with two measuring receptacles which alternately receive liquid from a delivery bowl and discharge the same through the usual hose and having means whereby the receptacles are alternately connected with the delivery bowl and with the hose.

A further object of the invention is to provide such an apparatus in which the valves which control the admission of liquid to and the delivery of the same from the measuring receptacles will be actuated from the pump operating mechanism.

Other objects of the invention will appear as the apparatus is described in detail.

In the accompanying drawings Fig. 1 is a front elevation of a dispensing apparatus embodying our invention, with one of the measuring receptacles partly broken away; Fig. 2 is a vertical section, partly broken away, of the apparatus shown in Fig. 1; Fig. 3 is a front elevation of a device for causing predetermined quantities of liquid to be delivered; Fig. 4 is a vertical sectional view of the device shown in Fig. 3; Fig. 5 is a sectional view taken through the valves controlling the admission of liquid to and the delivery of the same from the measuring receptacles; Fig. 6 is an elevation of the valve actuating devices; Fig. 7 is a longitudinal sectional view of the speed controlled mechanism for controlling the operation of the valves; Fig. 8 is a detail view of the connection between the clutch and the sleeve of the speed controlled mechanism; Fig. 9 is an elevation of the clutch; and Fig. 10 is a sectional detail view of the device for controlling the connection between the pump operating mechanism and the valve controlling mechanism.

In these drawings we have illustrated one embodiment of our invention and have shown the same as applied to any gasoline pump of a well known type but it will be understood that the invention may take various forms and may be applied to liquid dispensing apparatus of various kinds, whether hand operated or power operated.

In that embodiment of the invention here illustrated the pump comprises a hollow standard or housing 1 upon the upper end of which is supported a transparent delivery bowl 2. Mounted in the lower portion of the housing is a pump comprising a cylinder 3 which is connected by a supply pipe 4 with a suitable source of supply for liquid, such as an underground reservoir. The piston 5 of the pump is connected by a piston rod 6 with a cross head 7 which in turn is connected by a pitman 8 with a gear 9, which gear constitutes a crank wheel for operating the pump. Liquid is delivered from the upper end of the pump through a pipe 10 to the bowl 2. Extending from the upper portion of the bowl, through the standard to the storage reservoir, is an overflow pipe 11.

The gear 9 meshes with a pinion 12 which is mounted on a shaft 13 journaled in suitable bearings in the housing 1, one end of the shaft extending beyond the outer wall of the housing where it is provided with means such as a crank 14 for rotating the same and thereby operating the pump to deliver liquid to the bowl.

Liquid is delivered from the delivery bowl 2 to the customer's automobile, or to some other receptacle, through a flexible discharge pipe or hose 15. In order to insure absolute accuracy of measurement and to enable the customer to ascertain for himself whether or not he is receiving full measure we have interposed between the delivery bowl 2 and the hose 15 a measuring device which preferably consists of a pair of measuring receptacles 16 and 17, the walls of which are transparent so that their contents may be readily inspected. Means are provided for alternately connecting the two measuring receptacles with the delivery bowl and for alternately connecting the two measuring receptacles with the hose 15, the connecting means being of such a character that when one measuring receptacle is connected with the delivery bowl the other measuring receptacle may be connected with the hose, thereby enabling one receptacle to be filled and to then be discharged through the hose while the other receptacle is being filled. The connection between the measuring receptacle and the delivery bowl preferably comprises a valve, the casing 18 of which is connected with a conduit 19 leading from the delivery bowl 2, and which has two conduits 20 leading to the resepective measuring receptacles 16 and 17. Mounted in the casing is a rotary valve member 21 having a diametrically arranged port 22, one end of which communicates with an elongated channel 23 in the upper part of the valve casing and which when in one position will connect the delivery bowl with the measuring receptacle 16 and which when moved through a quarter rotation will connect the delivery bowl with the other measuring receptacle, 17. It will be apparent that the continued rotation of the valve member 22 in one direction will connect the two measuring receptacles alternately with the delivery bowl. The discharge of the liquid from the measuring receptacles is also controlled by a valve comprising a casing 24 having ports 25 leading from the respective measuring receptacles, 16 and 17, and having at its lower end a discharge port 26 with which the hose 15 is connected. A rotary valve member 27 mounted within the valve casing has a diametrical port 28 to alternately connect the measuring receptacles with the hose, in the manner above described. The two valve members are so arranged with relation one to the other that when the delivery bowl is connected with one measuring receptacle the other measuring receptacle will be connected with the hose, and when the two valves have been moved through a quarter rotation the connections will be reversed.

Each of the measuring receptacles has in its upper end a vent 83 and is provided with means controlled by the level of the liquid within the receptacle to open and close that vent. As here shown, a valve 81 is mounted in the vent and is of such a character that when unrestrained it will assume an open position, thus permitting air to enter or leave the measuring receptacle. Mounted within the receptacle is a float 82 so arranged that when the receptacle is full the float will contact with the inner end of the valve and seat the same, thus preventing the escape of liquid through the vent. As soon as the level of the liquid is lowered, as the contents of the receptacle are discharged, the float will drop away from the valve and permit the same to move to its open position.

The valve members 21 and 27 may be operated in any suitable manner but we prefer that either operation shall be controlled by the pump operating mechanism and that the arrangement shall be such that the pump operating mechanism will supply liquid to the delivery bowl while measured quantities of liquid are being withdrawn therefrom, thereby enabling an indefinite quantity of liquid to be measured and delivered from the apparatus without interruption. In that form of controlling mechanism here shown we have mounted on the shaft 13 of the pump operating mechanism a pinion 29 which meshes with a gear 30 rotatably mounted on a stud 31 carried by the housing 1. Rigidly secured to the gear 30 is a disk 32 having recesses 33 in diametrically opposite sides thereof. Each of the valves members 21 and 27 has a stem 34 projecting beyond the inner end thereof and, in the present instance, extending into the housing 1. Rigidly secured to the inner end of each valve stem is a locking member or star wheel 35 which, in the present instance, is approximately square but has its edges slightly curved or recessed to conform to the peripheral edge of the disk 32. The disk and the locking members 35 are so arranged that the curved edges of the locking members will have contact with the concentric edge of the disk and will thereby lock the valves against rotation while permitting the free movement of the disk. Rigidly connected with each locking plate is a tripping device 36 which is also shown as an approximately square plate the corners of which are so shaped that they will constitute trip fingers. The tripping device is so arranged with relation to the corresponding locking device that when the latter is in contact with the concentric edge of the disk 32 one of the fingers of the tripping device will extend inwardly beyond the edge of the disk and into the path of a stud or roller 37 carried by the disk, there being two of these studs arranged in advance of the respective recesses 33.

It will be apparent that as the disk is rotated, in the direction of the arrow in Fig. 6, the studs 37 will engage the trip fingers just as the recesses 33 reach the adjacent corners of the locking plate and as the continued movement of the disk rotates the tripping device and the locking plate the corner of the latter will enter the recess 33, thus permitting the locking device, and consequently the valve with which it is connected, to rotate. As the disk continues to rotate the combined action of the stud 37 on the trip finger and of the rear wall of the recess 33 on the point or corner of the locking device will rotate the locking device through a quarter of a rotation, thereby reversing the position of the valve with which the locking device is connected.

The valve actuating mechanism being operated from the pinion 29 on the shaft 13 of the pump operating mechanism it will be apparent that the operation of the crank 14 will operate the pump to supply liquid to the delivery bowl and will periodically reverse the valves to cause the two measuring receptacles to be alternately filled and discharged. The gearing is of such a character that with any usual speed of operation of the crank 14 there will be ample time for the one measuring receptacle to drain and the other to fill between successive reversals of the valves. To avoid the possibility of the pump operating mechanism being actuated at excessive speed, which would result in the valves being reversed before the one measuring receptacle was empty or the other one filled, we have provided speed controlled means for interrupting the operation of the valves in the event the pump operating mechanism is actuated at an excessive speed. For this purpose the pinion 29 is rotatably mounted on the shaft 13 and is rigidly connected with a gear 38 also loosely mounted on the shaft 13. The gear 38 meshes with a pinion 39 rotatably mounted on a shaft 40 mounted within the housing 1 and having secured thereto a pinion 41 which meshes with a gear 42 on the shaft 13, so that the movement of the shaft 13 is transmitted to the shaft 40 and from the shaft 40 to the gear 38 and pinion 29. As has been stated the pinion 39 is loosely mounted on the shaft 40 and rigidly connected with this pinion is a clutch member 43, here shown in the form of a brake drum having an internal friction surface. Arranged within the brake drum or clutch member is a friction band 44 which, as shown in Fig. 9 comprises two parts or shoes which are connected at their lower ends with an arm 45 carried by a hub 46 rigidly secured to the shaft 40. Arranged between the upper ends of the two parts of the brake band is a cam 47 which, in the present instance, is carried by a shaft 48 journaled in bearings in the hub and in a bracket 49 carried by the hub. Rigidly secured to the shaft 48 is an arm 50 which is connected by a link 51 with a sleeve 52 slidably mounted on the shaft 40. A spring 53 confined between the end of the sleeve and a fixed stop, such as a nut 54, on the shaft 40, presses the sleeve toward the clutch and holds the cam 47 normally in a position to expand the friction band and thus connect the drum 43 and pinion 39 with the shaft so that the valve operating mechanism will be actuated from the shaft 13. A centrifugally operated device is carried by the shaft 40 and, as here shown, this device comprises two weighted arms 55 arranged on opposite sides of the shaft and pivotally mounted on a pin 56 which is secured to the shaft and extends through the slots 57 in the opposite sides of the sleeve 52, thereby permitting the sleeve to have axial movement with relation to the pin. Connected with the weighted arms are fingers 58 which extend into the slots 57 and engage the ends thereof so that when the weighted arms are moved outwardly by centrifugal force, due to an excessive speed of rotation, the fingers will impart axial movement to the sleeve and thus move the cam 47 to an inoperative position, which will permit the friction band to contract and thus disconnect the drum 43 from the shaft 40 and interrupt the operation of the valve actuating mechanism. As soon as the speed of rotation has been reduced to normal the weights will return to their normal position and the spring 53 will again cause the clutch members to be engaged.

It is sometimes desirable that the valve controlling mechanism should be operated independently of the pump, as when the delivery bowl is to be drained at night. It is also sometimes desirable that the pump should be operated independently of the valve controlling mechanism, as, for example, when the bowl is to be filled prior to the delivery of any liquid. We have therefore provided a clutch mechanism by means of which either or both the pump and the valve operating mechanism may be connected with the shaft 13 and crank 14. In the present construction, as shown in detail in Fig. 10, the pinion 12 and gear 42 are rotatably mounted on the shaft 13 and are provided in their hubs with longitudinal slots 60 to receive a clutch member or longitudinally movable key 61 which is slidably mounted in a groove 62 in the shaft 13. This key has a recess 63 of a length slightly greater than the length of the hub of the gear 42 so that when this recess is moved in line with the hub the latter will be free to rotate on the shaft. When the recess in the key is in line with the gear 42 the outer end portion of the key will project into the slot of the hub of the gear 12 so that the pump will be connected with the shaft but the valve operating mechanism will be disconnected therefrom. When the key or clutch member is moved to the left, in Fig. 10, to cause the same to enter the slot in the hub of the gear 42, the opposite end of the key will be withdrawn from the hub of the gear 12, thereby disconnecting the pump from the shaft and connecting the valve operating mechanism therewith. When the key is moved to the right, from the position shown in Fig. 10, the left hand end of the key will enter the slot in the hub of the gear 42 and the right hand end of the key will remain in the slot in the hub of the pinion 12, thereby connecting both the pump and the valve operating mechanism with the shaft, this being the normal operative position of the clutch mechanism. The clutch member or key 61 may be operated in any suitable manner but, as here shown, a grooved collar 64 is slidably mounted on the shaft and is seated in a notch in the key. The arms of a yoke 65 extend into the groove of the collar 64 and the lever 66 is connected with the yoke for actuating the clutch member.

The apparatus is also provided with mechanism which may be set to interrupt the operation of the valves when a predetermined quantity of liquid has been discharged. As here shown, a supporting frame 67 is mounted on the apparatus above the measuring receptacles and has mounted therein a non-rotatably stud shaft 68. Rotatably mounted on this stud is a gear 69 which meshes with a pinion 70 on a pintle 71 extending from the upper valve member 21, so that the gear 69 will be rotated by the valve member. Rotatably mounted on the stud 68, in front of the gear, is a dial 72 having on its outer portion a circumferential series of graduations which, in the present instance, are numbered from one to ten to represent gallons. Rotatably mounted on the stud 68, in front of the dial, is a lever 73 having slidably mounted therein a spring pressed pin 74. The dial has a series of openings 75 and the gear 69 has a series of openings 76 arranged in line with the openings 75 in the dial and adapted to receive the pin 74 which thereby serves to connect the dial and the gear one to the other. A spring 77 is connected at one end to the fixed stud 68 and at its other end to the dial so that it will be placed under tension when the lever is moved with relation to the dial. An arm 78 carried by the supporting frame 67 has a forwardly extending lug 79 which extends across the path of the lever 73 when the latter has moved in a reverse direction. The dial has a projection or lug 80 which contacts with the lug 79 to check the movement of the dial by the spring 77 and thereby retain the dial in its zero position. When the customer calls for a given quantity of liquid, say five gallons, the pin 74 is retracted and the lever rotated to bring the same into line with the numeral 5 and the pin then inserted through the corresponding openings 75 and 76 in the dial and the gear. The operation of the valve mechanism will then cause the dial to rotate until the lever engages the lug 79 at which time it will be in a vertical position and this contact between the lever and the lug will interrupt the operation of the entire train of mechanism. The pin 74 is then retracted to release the dial and permit the same to be restored to its zero position by the spring 77.

While we have shown and described one embodiment of our invention we wish it to be understood that we do not desire to be limited to the details thereof as various modifications may occur to a person skilled in the art.

Having now fully described our invention, what we claim as new and desire to secure by Letters Patent, is:

1. In a liquid dispensing apparatus comprising a delivery bowl, a pump to supply liquid to said bowl, a shaft operatively connected with said pump, means to rotate said shaft, and a delivery pipe for said bowl, a pair of measuring receptacles, means comprising a rotary valve to alternately connect said receptacles with said delivery bowl, other means comprising a rotary valve to alternately connect said measuring receptacles with said delivery pipe, actuating mechanism for said valves comprising a rotatable member, and devices connected with the respective valves and engaging said rotatable member to hold said valves normally against movement and to periodically actuate said valves, and a geared connection between said rotatable member and said pump operating shaft.

2. In a liquid dispensing apparatus comprising a delivery bowl, a pump to supply liquid to said bowl, means for operating said pump, and a delivery pipe for said bowl, a measuring device interposed between said bowl and said delivery pipe and comprising a pair of measuring receptacles, valves to connect each of said measuring receptacles alternately with said bowl and with said delivery pipe, said valves being so arranged that when one measuring receptacle is connected with said bowl the other measuring receptacle will be connected with said delivery pipe, means controlled by said pump operating means for actuating said valves to reverse the connections between said measuring receptacles and said bowl and said delivery pipe, respectively, and speed controlled means to interrupt the operation of said valve when said pump operating means is actuated at a speed in excess of a predetermined rate.

3. In a liquid dispensing apparatus comprising a delivery bowl, a pump to supply liquid to said bowl, means for operating said pump, and a delivery pipe for said bowl, a measuring device interposed between said bowl and said delivery pipe and comprising a pair of measuring receptacles, valves to connect each of said measuring receptacles alternately with said bowl and with said delivery pipe, said valves being so arranged that when one measuring receptacle is connected with said bowl the other measuring receptacle will be connected with said delivery pipe, operating mechanism for said valves, means for operatively connecting said valve operating mechanism with said pump operating means comprising a clutch and a centrifugally operated device to actuate said clutch to interrupt the operation of said valve operating mechanism when said pump operating mechanism is actuated at excessive speed.

4. In a liquid dispensing apparatus comprising a delivery bowl, a pump to supply liquid to said bowl, an operating shaft connected with said pump, means for actuating said shaft, and a delivery pipe for said bowl, a pair of measuring receptacles interposed between said delivery bowl and said delivery pipe, valves to connect each of said measuring receptacles alternately with said bowl and with said delivery pipe, said valves being so arranged that when one measuring receptacle is connected with said bowl the other measuring receptacle will be connected with said delivery pipe, means for operating said valves to periodically reverse said connections, and a connection between said valve operating mechanism and said pump operating shaft comprising a friction drum operatively connected with said valve operating mechanism, a friction band operatively connected with said shaft and a centrifugally operated device to control the frictional contact between said friction drum and said friction band.

5. In a liquid dispensing apparatus comprising a delivery bowl, a pump to supply liquid to said bowl, an operating shaft connected with said pump, means for actuating said shaft, and a delivery pipe for said bowl, a pair of measuring receptacles interposed between said delivery bowl and said delivery pipe, valves to connect each of said measuring receptacles alternately with said bowl and with said delivery pipe, said valves being so arranged that when one measuring receptacle is connected with said bowl the other measuring receptacle will be connected with said delivery pipe, means for operating said valves to periodically reverse said connections, said means comprising a pinion loosely mounted on said pump shaft, a gear connected with said pinion and rotatably mounted on said pump operating shaft, a second shaft, a geared connection between said second shaft and said spring operating shaft, a pinion rotatably mounted on said second shaft, and meshing with the first mentioned gear on said pump operating shaft, a friction drum connected with the last mentioned pinion, a friction band arranged within said drum and connected with said second shaft, spring actuated means to hold said friction band normally in contact with said friction drum, and a centrifugal device to move said means against the action of said spring to disconnect said friction band from said drum.

6. In a liquid dispensing apparatus comprising a delivery bowl, a pump to supply liquid to said bowl, means for operating said pump, and a delivery pipe for said bowl, a measuring device interposed between said bowl and said delivery pipe and comprising a pair of measuring receptacles, valves to connect each of said measuring receptacles alternately with said bowl and with said delivery pipe, said valves being so arranged that when one measuring receptacle is connected with said bowl the other measuring receptacle will be connected with said delivery pipe, valve actuating mechanism for reversing said valves, and means for connecting said valve actuating mechanism with and disconnecting the same from said pump operating means.

7. In a liquid dispensing apparatus comprising a delivery bowl, a pump to supply liquid to said bowl and a delivery pipe for said bowl, a pair of measuring receptacles interposed between said bowl and said delivery pipe, valves to connect each of said measuring receptacles alternately with said bowl and with said delivery pipe, said valves being so arranged that when one measuring receptacle is connected with said bowl the other measuring receptacle will be connected with said delivery pipe, means for operating said valves, an actuating device, and means for connecting said actuating device with either said valve operating mechanism or said pump, or for connecting the same with both said operating mechanism and said pump.

8. In a liquid dispensing apparatus comprising a delivery bowl, a pump to supply liquid to said bowl and a delivery pipe for said bowl, a pair of measuring receptacles interposed between said bowl and said delivery pipe, valves to connect each of said measuring receptacles alternately with said bowl and with said delivery pipe, said valves being so arranged that when one measuring receptacle is connected with said bowl the other measuring receptacle will be connected with said delivery pipe, means for operating said valves, a shaft, means to rotate said shaft, a gear rotatably mounted on said shaft, a pinion rotatably mounted on said shaft, means to connect said gear with said valve operating mechanism, means to connect said pinion with said pump, and means for connecting either said pinion or said gear with said shaft or for connecting both said pinion and said gear to said shaft.

9. In a liquid dispensing apparatus comprising a delivery bowl, a pump to supply liquid to said bowl and a delivery pipe for said bowl, a pair of measuring receptacles interposed between said bowl and said delivery pipe, valves to connect each of said measuring receptacles alternately with said bowl and with said delivery pipe said valves being so arranged that when one measuring receptacle is connected with said bowl the other measuring receptacle will be connected with said delivery pipe, means for operating said valves, a shaft having a longitudinal slot, means for rotating said shaft, a pinion rotatably mounted on said shaft, having a slot in the hub thereof and operatively connected with said pump, a gear rotatably mounted on said shaft, having a slot in the hub thereof and operatively connected with said valve operating means, a key slidably mounted in the slot in said shaft and having parts adapted to be moved into and out of the slots in the hubs of said gear and said pinion, and means for actuating said key.

10. In a liquid dispensing apparatus comprising a delivery bowl, a pump to supply liquid to said bowl, means for operating said pump, and a delivery pipe for said bowl, a measuring device interposed between said bowl and said delivery pipe and comprising a pair of measuring receptacles, valves to connect each of said measuring receptacles alternately with said bowl and with said delivery pipe, said valves being so arranged that when one measuring receptacle is connected with said bowl the other measuring receptacle will be connected with said delivery pipe, means for actuating said valves to reverse the connections between the respective measuring receptacles and said bowl and said delivery pipe, and means connected with one of said valves for interrupting the operation of both valves when a predetermined quantity of liquid has been delivered.

11. In a liquid dispensing apparatus comprising a delivery bowl, a pump to supply liquid to said bowl, means for operating said pump, and a delivery pipe for said bowl, a measuring device interposed between said bowl and said delivery pipe and comprising a pair of measuring receptacles, valves to connect each of said measuring receptacles alternately with said bowl and with said delivery pipe, said valves being so arranged that when one measuring receptacle is connected with said bowl the other measuring receptacle will be connected with said delivery pipe, means for actuating said valves to reverse the connections between the respective measuring receptacles and said bowl and said delivery pipe, a rotatable dial, a gear rotatable about the axis of said dial, means to operatively connect said gear with one of said valves, a lever rotatable about the axis of said dial with relation thereto, means carried by said lever for connecting said dial and said gear to cause said dial to be actuated from said valve, and means to interrupt the movement of said dial when said lever is restored to its normal position.

12. In a liquid dispensing apparatus comprising a delivery bowl, a pump to supply liquid to said bowl, means for operating said pump, and a delivery pipe for said bowl, a measuring device interposed between said bowl and said delivery pipe and comprising a pair of measuring receptacles, valves to connect each of said measuring receptacles alternately with said bowl and with said delivery pipe, said valves being so arranged that when one measuring receptacle is connected with said bowl the other measuring receptacle will be connected with said delivery pipe, means for actuating said valves to reverse the connections between the respective measuring receptacles and said bowl and said delivery pipe, a rotatable dial having a circumferential series of indicating numbers, a stop to limit the movement of said dial in a reversed direction, a lever mounted for movement about the axis of said dial into line with a selected one of said indicating numbers, a gear operatively connected with one of said valves, means carried by said lever for connecting the same with said dial and with said gear whereby all said parts will be actuated by said valve, means to interrupt the movement of said lever when the latter has been returned to its normal position, and a spring acting on said dial to return the same to its zero position when it has been disconnected from said lever.

13. In a liquid dispensing apparatus, a source of supply for liquid to be dispensed comprising a pump and operating mechanism therefor, a delivery pipe, a pair of measuring receptacles interposed between said source of supply and said delivery pipe, each of said measuring receptacles having an inlet to connect the same with said source of supply and an outlet to connect the same with said delivery pipe, valves to so control said inlets and said outlets that when one measuring receptacle is connected with said source of supply the other measuring receptacle will be connected with said delivery pipe, actuating means for said valves operatively connected with said pump operating mechanism, and speed controlled means to limit the speed at which said valve actuating means are operated.

14. In a liquid dispensing apparatus, a source of supply for liquid to be dispensed comprising a pump and operating mechanism therefor, a delivery pipe, a pair of measuring receptacles interposed between said source of supply and said delivery pipe, each of said measuring receptacles having an inlet to connect the same with said source of supply and an outlet to connect the same with said delivery pipe, a rotary valve to control said inlets, a second rotary valve to control said outlets, said valves being so arranged that when one measuring receptacle is connected with said source of supply the other measuring receptacle will be connected with said delivery pipe, a valve actuating device, means comprising a clutch to connect said valve actuating device with said pump operating mechanism, and a centrifugally operated device to actuate said clutch when said pump operating mechanism is actuated at an excessive speed.

15. In a liquid dispensing apparatus, a source of supply for liquid to be dispensed comprising a pump and operating mechanism therefor, a delivery pipe, a pair of measuring receptacles interposed between said source of supply and said delivery pipe, each of said measuring receptacles having an inlet to connect the same with said source of supply and an outlet to connect the same with said delivery pipe, valves to so control said inlets and said outlets that when one measuring receptacle is connected with said source of supply the other measuring receptacle will be connected with said delivery pipe, valve actuating mechanism, and means under the control of the operator for connecting said valve actuating mechanism with and for disconnecting the same from said pump operating mechanism.

16. In a liquid dispensing apparatus, a source of supply for liquid to be dispensed comprising a pump and operating mechanism therefor, a delivery pipe, a pair of measuring receptacles interposed between said source of supply and said delivery pipe, each of said measuring receptacles having an inlet to connect the same with said source of supply and an outlet to connect the same with said delivery pipe, valves to so control said inlets and said outlets that when one measuring receptacle is connected with said source of supply the other measuring receptacle will be connected with said delivery pipe, valve operating mechanism, an actuating device, and means for connecting said actuating device with either said valve operating mechanism or said pump operating mechanism or for connecting the same with both said valve operating mechanism and said pump operating mechanism.

17. In a liquid dispensing apparatus, a source of supply for liquid to be dispensed comprising a pump and operating mechanism therefor, a delivery pipe, a pair of measuring receptacles interposed between said source of supply and said delivery pipe, valve controlled means for connecting said receptacles with said source of supply and with said delivery pipe, said connecting means being so arranged that when one measuring receptacle is connected with said source of supply the other measuring receptacle will be connected with said delivery pipe, and means controlled by the operating mechanism for said pump for actuating said connecting means to reverse said connections at intervals determined by said operating mechanism.

In testimony whereof, we affix our signatures hereto.

CHARLES O. STRAUB.
HARRY F. JACKSON.